United States Patent [19]

Inoue et al.

[11] 4,029,323
[45] June 14, 1977

[54] FLUID PRESSURE SEAL ARRANGEMENT

[75] Inventors: Gentei Inoue; Chuichi Sato, both of Fujisawa; Mamoru Tanaka, Yokohama; Nobuhiro Matsuo, Kamakura, all of Japan

[73] Assignee: Nippon Seiko Kabushiki Kaisha, Tokyo, Japan

[22] Filed: Feb. 13, 1976

[21] Appl. No.: 658,008

Related U.S. Application Data

[62] Division of Ser. No. 347,529, April 3, 1973, Pat. No. 3,949,996.

[30] Foreign Application Priority Data

Apr. 11, 1972 Japan .............................. 47-35717

[52] U.S. Cl. .................................................. 277/15
[51] Int. Cl.² ........................................ F16J 15/40
[58] Field of Search ........................ 277/3, 15, 27

[56] References Cited

UNITED STATES PATENTS 3,414,274  12/1968  Aronson .............................. 277/15
3,880,434  4/1975   Echard ................................ 277/15

Primary Examiner—Robert I. Smith
Attorney, Agent, or Firm—Beveridge, DeGrandi, Kline & Lunsford

[57] ABSTRACT

In a body supporting another body via a land into which sealing gas is supplied via an in-coming gas groove or grooves for liquid sealing purpose and from which fluid is discharged through a fluid groove, one or more sets of out-going gas grooves are formed opening to the land in between the in-coming gas groove(s) and the fluid groove so that both undesirable mixing of the sealing gas with the fluid and accidental invasion of outside dust or the like into the arrangement is effectively prevented.

1 Claim, 6 Drawing Figures

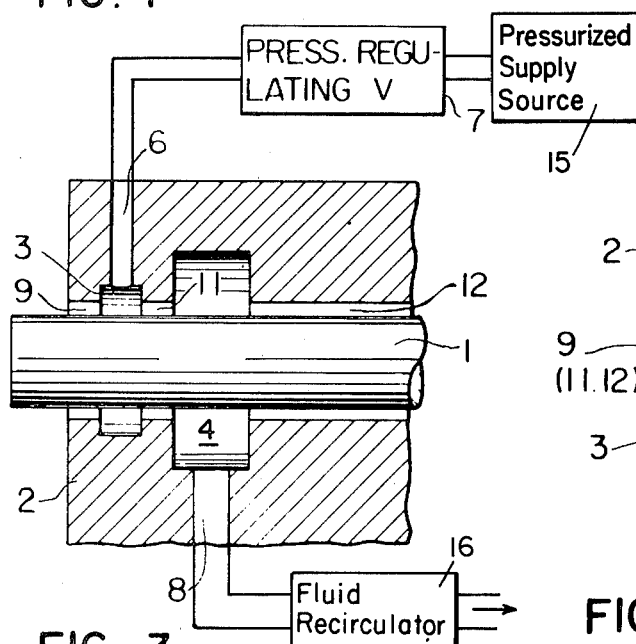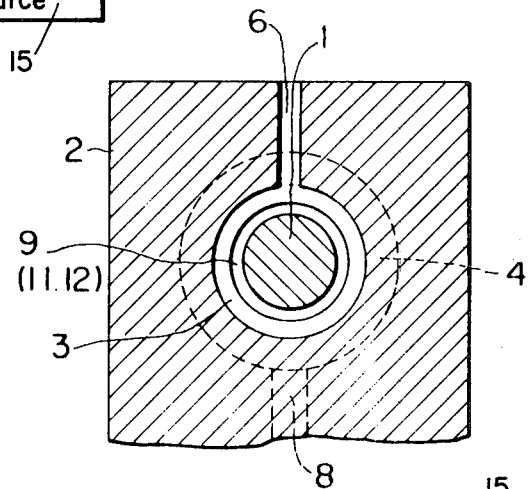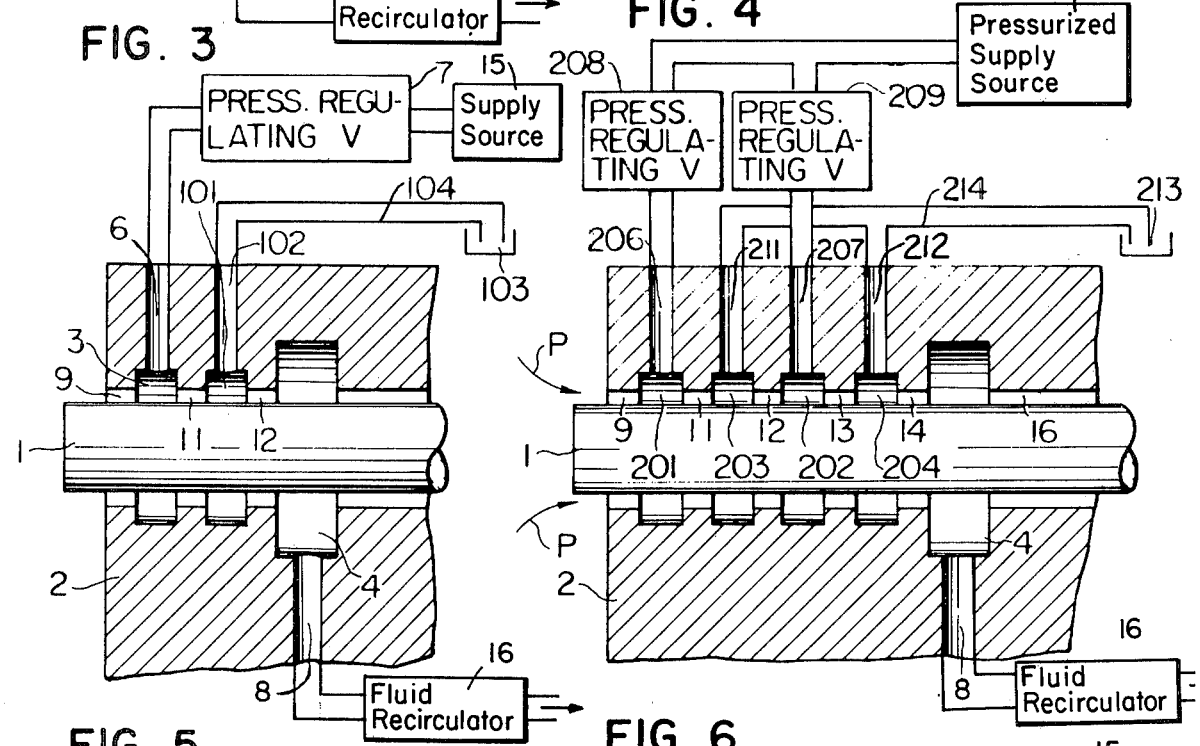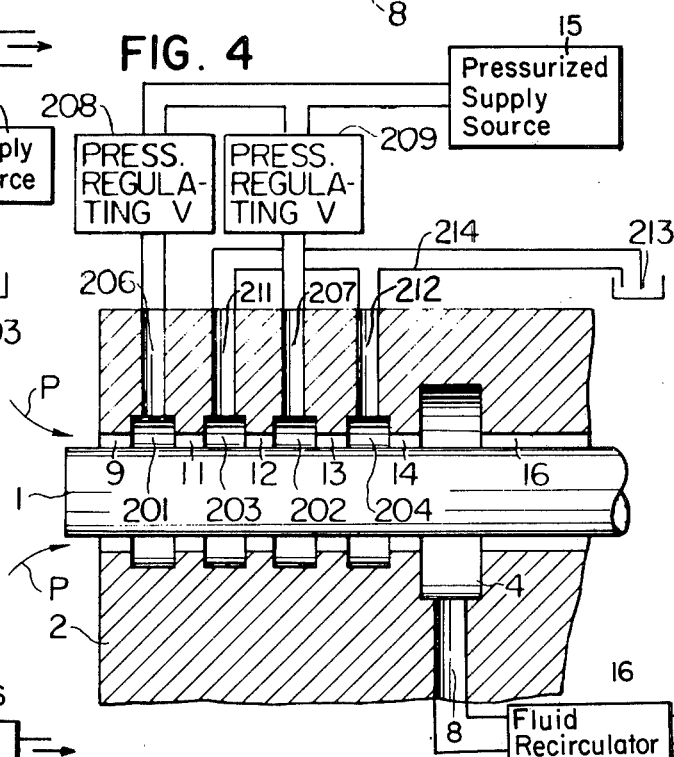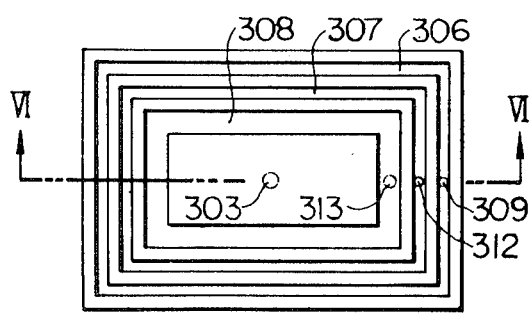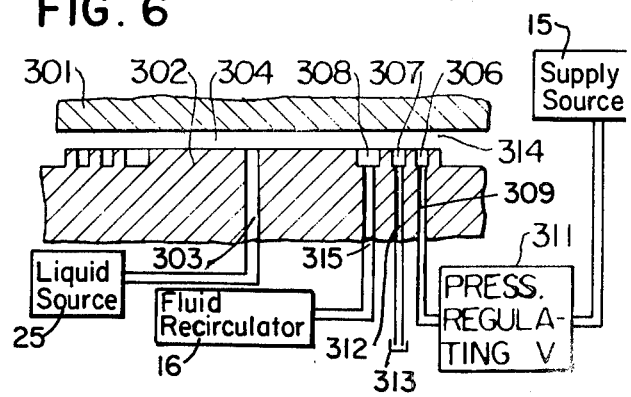

FLUID PRESSURE SEAL ARRANGEMENT

This is a division of application Ser. No. 347,529, filed Apr. 3, 1973 and now U.S. Pat. No. 3,949,996.

The present invention relates to improved static pressure seal arrangement, more particularly relates to static pressure seal arrangement for preventing outward leakage of inside fluid and inward invasion of outside fluid and dusts or the like via a land formed between a rotary shaft and its supporting bearing part or between two confronting surfaces.

Conventional mechanisms for sealing liquid re rotary shafts or confronting surfaces are generally classified into two groups; one being the so-called contact type seals such as O-ring seals, oil seals and mechanical seals and the other being the so-called non-contact type seals such as static pressure seals, labyrinth seals and centrifugal oil seals.

It is well known that the non-contact type seals should be employed in case friction and/or wearing-out of the seal arrangement should be obviated particuarly when the same is used for rotary shafts of high speed rotation.

However, the known non-contact type seals are accompanied by several disadvantages that particularly the labyrinth seals and the centrifugal oil seals are inevitably accompanied by complecated structures and instable unbalanced rotation of the rotary shaft. Particularly, in the case of large flow rates, there is considerable lowering in the sealing effect.

The object of the present invention is to provide a static pressure seal arrangement of a simple structure with high sealing effect.

In order to attain this object according to the present invention, one or more sets of out-going gas grooves are formed opening to a land, which positions between a rotary shaft and a bearing part or between two confronting surfaces, at positions in between in-coming gas groove(s) and fluid groove.

Further features and advantages of the present invention may be made clearer in the following description, reference being made to the accompanying drawings, in which;

FIG. 1 is a partly sectional vertical side plane view of the conventional static pressure seal arrangement, FIG. 2 is a sectional top plane view of the arrangement shown in FIG. 1, FIG. 3 is a partly sectional side plane view of basic embodiment of the static pressure seal arrangement of the present invention, FIG. 4 is a partly sectional side plane view of another embodiment of the static pressure seal arrangement of the present invention, FIG. 5 is a top plane view of the other embodiment of the static pressure seal arrangement of the present invention, FIG. 6 is a section taken along the line VI—VI in FIG. 5.

Referring to FIGS. 1 and 2, there is shown a typical example of the static pressure seal arrangement of the conventional type. In the arrangement, a rotary shaft 1 is supported by a bearing part 2 in which two annular grooves 3 and 4 of different diameters with respect to the longitudinal axis of the rotary shaft 1 are formed encircling the rotary shaft 1. A sealing gas taker-in hole 6 is formed radially through the bearing part 2 in connection with the annular groove 3 on the left side in the drawing. The outlet part of this sealing gas taker-in hole 6 is communicated to pressurized supply source 15 containing of the sealing gas via a pressure regulating valve 7. Separately from this, a fluid discharge hole 8 is formed radially through the bearing part 2 in connection with the annular groove 4 on the right side in the drawing. The fluid is recirculated to the bearing by fluid recirculator 16, which is conventional and the exact form of which is known to those skilled in the art. Further, lands or annular spaces 9, 11 and 12 are formed embracing the rotary shaft 1 in connection with the two annular grooves 3 and 4 within the bearing part 2. Land 9 is shown in cross-section in FIG. 2. In this way, the conventional static pressure seal arrangement is accompanied with advantages that the structure is very simple, there is no need for forming stepped part(s) on the rotary shaft, the rotation of the rotary shaft is much stable and the arrangement can be assembled together very simply.

Despite of such advantages, the conventional static pressure seal arrangement is inevitably accompanied by fatal drawbacks as follows also. In case when it is desired re this arrangement to enhance the sealing effect, the sealing gas pressure inside the annular groove 3 (hereinafter referred to as "the in-coming gas annular groove 3") is desirably made higher than the pressure of the liquid flowing into the annular groove 4 (hereinafter referred to as "the fluid annular groove 4"). As a result of this pressure setting, the sealing gas throttled during its passage through the land 11 blows into the fluid annular groove 4 in a highly pressured condition so that it inevitably mixes with the fluid already dominant within the fluid annular groove 4. This inevitable mixing of the sealing gas within the liquid causes increase in the compressibility of the later and the latter is made inferior. In addition, under such situation, the fluid discharge hole 8 must allow the passage of the liquid accompanied with the sealing gas causing increase in the flow resistance inside the fluid discharge hole 8 itself. This increase in the flow resistance naturally induces corresponding escalation of the pressure inside the fluid annular groove 4, thereby resulting in undesirable lowering in the sealing effect of the seal arrangement.

A basic embodiment of the static pressure seal arrangement according to the present invention is shown in FIG. 3, in which elements substantially similar to those used in the foregoing arrangement in FIGS. 1 and 2 are shown with similar reference numerals. In addition to such known elements, a sealing gas discharge annular groove 101 is formed in the bearing part 2 encircling the rotary shaft 1 at a location in between the gas annular groove 3 and the fluid annular groove 4. This annular groove 101 (hereinafter referred to as "the out-going gas annular groove 101") is communicated to the in-coming gas annular groove 3 via the land 11 and to the fluid annular groove 4 via the land 12. In a radial connection with this out-going gas annular groove 101 there is formed, radially through the bearing part, a sealing gas discharge hole 102, whose outlet port is connected to a tank 103 by a piping 104.

Because the out-going gas annular groove 101 is provided in between the in-coming gas annular groove 3 and the fluid annular groove 4, the sealing gas supplied into the in-coming gas annular groove 3 is divided into two separate flows; one of the flows spouts outside the bearing part 2 through the left side land 9 (in the drawing) while preventing undesirable invasion of fluid and dusts or the like into the system while another of the flows blows through the middle land 11 (in the drawing) for the sealing effect. This part of the sealing gas flows into the out-going gas annular groove 101. Due to a pressure relationship to the flowing out fluid, a pressure is generated within the out-going gas annular groove 101 so that the same seals, via the right side (in the drawing) land 12, the fluid flowing out into the fluid groove 4. By proper control of the sealing gas pressure by the pressure regulating valve 7, flowing-in of the fluid from the right side land 12 into the out-going gas annular groove 101 can be effectively hindered thereby preventing the undesirable mixing of the sealing gas with the liquid, which is the case with the conventional static pressure seal arrangement. When the fluid accidentally flows into the out-going gas annular groove 101, the same mixed with the sealing gas is discharged therefrom through the sealing gas discharge hole 102 and is conducted into the tank 103 via the piping 104. In the tank 103, the sealing gas is separated from the liquid in a sufficiently long period of time and, consequently, the compressibility of the liquid is not increased and the liquid itself is not made inferior too. Further, because the pressure inside the fluid annular groove is not increased, there results no increase in the flow resistance in the fluid discharge hole 8 causing no lowering in the sealing effect of the seal arrangement.

A modification of the static pressure seal arrangement in FIG. 3 is shown in FIG. 4 in which elements substantially similar to those used in the foregoing arrangement in FIGS. 1 and 2 are shown and perform the same functions with similar reference numerals. In the case of this embodiment, two sets of in-coming gas annular grooves 201 and 202 and two sets of out-going gas annular grooves 203 and 204 are arranged alternately and spacedly from each other along the length of the rotary shaft 1. The in-coming gas annular grooves 201 and 202 are provided with radially connected sealing gas taker-in holes 206 and 207, respectively. Outlet ports of the sealing gas taker-in holes 206 and 207 are communicated to a common given supply source (not shown) of the sealing gas via pressure regulating valves 208 and 209, respectively. The out-going gas annular grooves 203 and 204 are provided with radially connected sealing gas discharge holes 211, 212, whose outlets are communicated to a common tank 213 via a branched common piping 214. The five sets of annular grooves 201, 202, 203, 204 and 4 are communicated to each other by the lands 9 through 16.

In the case of this arrangement, the direction of the sealing gas flowing into the left side (in the drawing) out-going gas annular groove 203 through the land 11 is opposite to that of the sealing gas flowing into the out-going gas annular groove 203 through the land 12. Consequently, the pressure inside the out-going gas annular groove 203 is escalated while this causing the corresponding escalation in the flow speeds of the sealing gas through the lands 9 and 13. The sealing of the fluid takes place in the land 14.

In the case of this embodiment, when a liquid pressure marked as P in the drawing is applied to the arrangement, invasion of the liquid into the arrangement is prevented effectively in the land 9 through which the sealing gas spouts out at the raised flow speed as above mentioned. Consequently, this embodiment is remarkably effective for both inside sealing and outside sealing. Further, proper throttle mechanisms may be used instead of the pressure regulating valves by suitably designing the operation characteristics of the throttle machanisms.

A further embodiment of the static pressure seal arrangement of the present invention is shown in FIGS. 5 and 6. In the case of this arrangement, a body 301 is placed over a base seat 302 which is provided with a central liquid hole 303 through which liquid flows out into a land 304 formed in between the confronting faces of the body 301 and the base seat 302. Along the land 304, there is formed in the upper surface of the base seat 302 an in-coming gas groove 306, an out-going gas groove 307 and an out-going liquid fluid groove 308 reading from the outside towards the center of the base seat 302. The in-coming gas groove 306 is communicated to a given supply source (not shown) of the sealing gas via a sealing gas taker-in hole 309 and a pressure regulating valve 311. The out-going gas groove 307 is accompanied with a sealing gas discharge hole 312 connected thereto which discharges gas into the tank 313, while the fluid groove 308 is connected to a fluid discharge hole 315 for the liquid fluid to flow to the fluid recirculator 316. All the holes 309, 312 and 315 are formed through the body of the bace seat 302.

In the case of this embodiment, the liquid flowing out from the central liquid hole 303 is effectively sealed at a position in the land 304 between the out-going gas groove 307 and the fluid groove 308. At the same time, invasion of the outside dust or the like into the arrangement is effectively prevented by sealing at the position 314 in the land 304.

What is claimed is;

1. A static pressure seal arrangement for containing liquid between a planar base seat surface and a body overlying but spaced from said surface, said base seat including a liquid intake passage and a liquid outflow passage nearer the periphery of the base seat than said intake passage and connecting with a continuous liquid outlet groove recessed in said base seat surface and totally enclosing an interior area thereof, comprising, at least a continuous inlet sealing gas groove recessed in said base seat surface and totally enclosing an interior area thereof, at least a continuous sealing gas outlet groove recessed in said base seat surface, said at least an outlet groove being located interiorally of at least one inlet groove, said at least an outlet groove also totally enclosing an interior area of said surface, said gas inlet and outlet grooves being located exteriorly of said liquid outlet groove, a supply passage in said base seat extending perpendicular and connecting with each gas inlet groove, and an output passage in said base seat extending perpendicular and connecting with each gas outlet groove.

* * * * *